United States Patent
Bernadat et al.

(10) Patent No.: US 8,567,788 B2
(45) Date of Patent: Oct. 29, 2013

(54) MOTOR VEHICLE BRAKE MASTER CYLINDER SEAL

(75) Inventors: Olivier Bernadat, Le Perreux (FR); François Gaffe, Bondy (FR); Laurent Lhuillier, Le Blanc Mesnil (FR); Antony Auguste, Villier sur Marne (FR)

(73) Assignee: Robert Bosch GmbH, Stuttgart (DE)

( * ) Notice: Subject to any disclaimer, the term of this patent is extended or adjusted under 35 U.S.C. 154(b) by 788 days.

(21) Appl. No.: 12/640,821

(22) Filed: Dec. 17, 2009

(65) Prior Publication Data

US 2010/0156052 A1   Jun. 24, 2010

(30) Foreign Application Priority Data

Dec. 19, 2008  (FR) .................................... 08 07186

(51) Int. Cl.
*F16J 9/20* (2006.01)
*F16J 15/32* (2006.01)
*F02F 5/00* (2006.01)
*B60T 11/236* (2006.01)

(52) U.S. Cl.
USPC ............ 277/439; 277/436; 277/438; 277/567

(58) Field of Classification Search
USPC .......................... 277/436, 438, 439, 566, 567
See application file for complete search history.

(56) References Cited

U.S. PATENT DOCUMENTS

| | | | |
|---|---|---|---|
| 4,326,379 A | 4/1982 | Dauvergne | |
| 4,781,024 A * | 11/1988 | Nakamura | ....................... 60/533 |
| 6,272,858 B1 | 8/2001 | Takano et al. | |
| 7,104,059 B2 | 9/2006 | Tsubouchi et al. | |
| 7,343,741 B2 * | 3/2008 | Bernadat et al. | ................. 60/588 |
| 7,401,468 B2 * | 7/2008 | Mouri et al. | ..................... 60/588 |
| 7,520,132 B2 | 4/2009 | Chiba | |
| 7,934,378 B2 * | 5/2011 | Gaffe et al. | ..................... 60/588 |
| 7,937,940 B2 * | 5/2011 | Gaffe et al. | ..................... 60/588 |
| 7,966,813 B2 | 6/2011 | Struschka | |
| 8,276,994 B2 * | 10/2012 | Lee et al. | .................... 303/114.1 |
| 2006/0219507 A1 * | 10/2006 | Drott et al. | ............... 188/322.17 |
| 2007/0283691 A1 | 12/2007 | Tetsuka et al. | |

(Continued)

FOREIGN PATENT DOCUMENTS

DE    102006040487    8/2007
EP         778190    6/1997

(Continued)

OTHER PUBLICATIONS

FR0807186 Search Report and Written Opinion.

(Continued)

*Primary Examiner* — Vishal Patel
*Assistant Examiner* — Nicholas L Foster
(74) *Attorney, Agent, or Firm* — Michael Best & Friedrich LLP

(57) ABSTRACT

Master cylinder for a hydraulic braking circuit, particularly for a motor vehicle, comprising an annular seal (1) placed in a housing (6) of the body comprising an internal dynamic sealing lip (14) surrounding the piston, fitting into an annular groove (20) of the piston when this piston is in a rear rest position, an outer static sealing lip (10) pressing against a wall of the housing, and an additional static sealing lip (16) which presses against a wall of the housing of this seal and with the outer lip defines a small closed volume (V) of liquid.

19 Claims, 3 Drawing Sheets

(56) References Cited

U.S. PATENT DOCUMENTS

| | | | |
|---|---|---|---|
| 2010/0066028 A1* | 3/2010 | Aoki et al. | 277/353 |
| 2010/0154407 A1* | 6/2010 | Bernadat et al. | 60/533 |
| 2010/0212313 A1* | 8/2010 | Aoki et al. | 60/533 |
| 2011/0209472 A1* | 9/2011 | Aoki et al. | 60/585 |

FOREIGN PATENT DOCUMENTS

| | | | |
|---|---|---|---|
| EP | 1616768 A1 | | 1/2006 |
| JP | 2004231093 | | 8/2004 |
| JP | 200762570 | | 3/2007 |
| WO | WO2008/054010 | * | 5/2008 |

OTHER PUBLICATIONS

Office Action from the United States Patent and Trademark Office for U.S. Appl. No. 12/638,379 dated Dec. 21, 2012 (5 pages).

FR Patent Office Search Report and Written Opinion for Application No. 0807183 dated Oct. 29, 2009 (5 pages).

* cited by examiner

MOTOR VEHICLE BRAKE MASTER CYLINDER SEAL

BACKGROUND OF THE INVENTION

The present invention relates essentially to a seal for a brake master cylinder, particularly for a motor vehicle.

Motor vehicle brake controls generally comprise a brake pedal acting on a master cylinder to transmit, via a hydraulic circuit, a liquid pressure to receivers that brake the various wheels.

The brake pedal acts on a piston sliding axially in a body comprising a seal comprising a lip which presses against the piston, in order to separate a rear volume containing a reserve of liquid at atmospheric pressure from a front volume comprising a chamber pressurized by the displacement of this piston.

A brake master cylinder of this type is described in U.S. Pat. No. 6,272,858 B1, which has a circular seal with two lips. An inner lip surrounds the piston providing dynamic sealing. When the piston is at rest in the rear position, the inner lip enters a piston groove which has a shallow depth and gently inclined side walls.

In this rest position of the piston, a radial drilling formed in the piston and opening into the groove becomes positioned behind the inner lip of the lip seal to place the pressure chamber in communication with the reserve of liquid, and if necessary readjust the volume of the hydraulic circuit.

The lip seal is wedged axially in an annular housing of the body surrounding the piston, and comprises an outer lip which presses against a cylindrical bottom of this annular housing, to provide static sealing between the pressure chamber and the rear volume.

One main disadvantage with this master cylinder is that at the static sealing lip, small solid particles may, as a result of movements of the fluid when the pressure circuit is being topped up, for example, become lodged under this lip and remain trapped by the lip which is constantly pressed against the outside diameter in a static manner. The particles thus lodged under the lip may ultimately cause leaks as the lip is no longer evenly applied to the surface opposite.

SUMMARY OF THE INVENTION

It is a particular object of the present invention to avoid these disadvantages of the prior art and to bring a simple and effective solution to the creation of a brake master cylinder static seal of the lip seal type.

To this end, the present invention proposes a master cylinder for a hydraulic braking circuit, particularly for a motor vehicle, comprising a piston sliding axially in a body and collaborating with an annular lip seal placed in a housing of the body, this seal comprising an internal dynamic sealing lip surrounding the piston, fitting into an annular groove of the piston when this piston is in a rear rest position, and an outer static sealing lip pressing against a wall of the housing, characterized in that the seal comprises an additional sealing lip which presses against a radial wall of the housing of this seal and with the outer lip defines a small closed volume of liquid.

One essential advantage of the master cylinder according to the invention is that in a simple and economical way it is possible to keep a small volume of liquid between the two static sealing lips and, during an operation, vary this volume by creating a flow that drives out any particles that may have become trapped by the lips.

The master cylinder according to the invention may further comprise one or more of the following features, which may be combined with one another.

According to another feature of the invention, when the piston leaves its rear rest position, the inner lip leaving the annular groove, the annular seal comprises means for compressing the small volume and driving the liquid out of this volume.

Advantageously, the outer lip is positioned pressing against the wall of the housing with a slight inclination and forms a check valve that opens in the event of a raised pressure in the small volume.

Advantageously, the additional lip is positioned pressing against the wall of the housing with a slight inclination, and forms a check valve that opens in the event of a reduced pressure in the small volume.

According to one particular embodiment of the invention, the outer lip extends substantially axially, pressing against a radially exterior cylindrical surface of the housing, and the additional lip extends substantially radially, pressing against a planar radial rear surface of this housing.

Advantageously, the annular seal comprises an axial lip which is radially intermediate between the outer lip and the inner lip and is directed substantially axially, and the end of which presses against a substantially radial front surface of the annular housing.

BRIEF DESCRIPTION OF THE DRAWINGS

The invention will be better understood and other features and advantages will become more clearly apparent from reading the following description given by way of example, with reference to the attached drawings in which.

DETAILED DESCRIPTION

Figure 1:
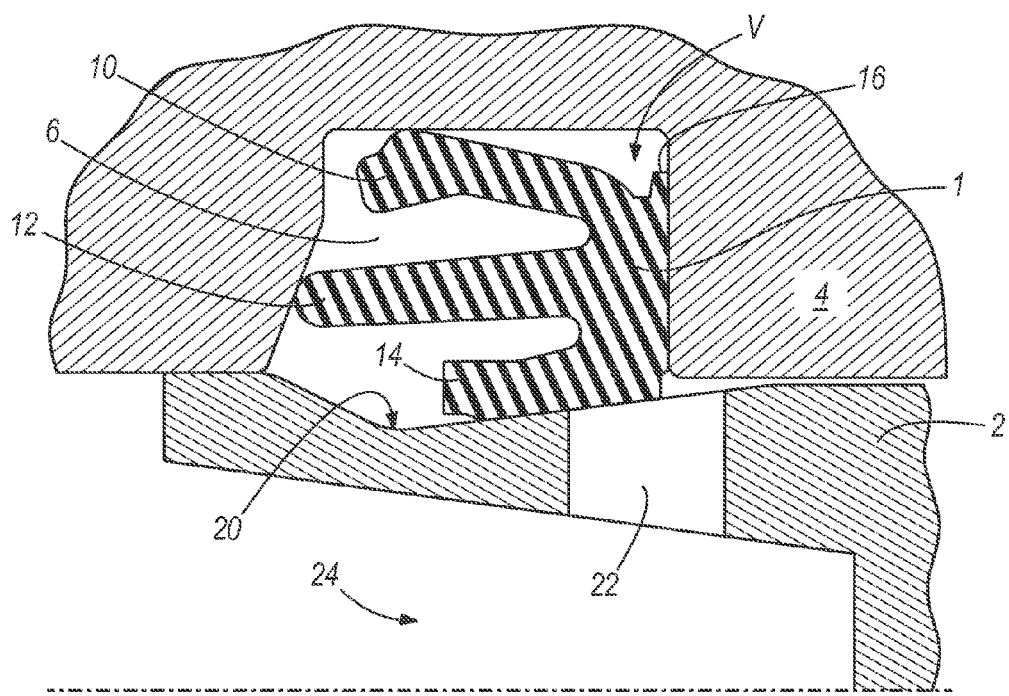
FIG. 1 is a half-view in axial section of a master cylinder annular seal according to the invention, the piston being in a rear rest position.

FIGS. 1 to 4 depict an annular seal 1 surrounding a piston 2 that slides axially in a body 4 of a brake master cylinder.

The annular seal 1 is mounted in an annular housing 6 of the body 4 and comprises an outer lip 10 the end of which presses radially against a cylindrical outer wall of this housing in order to provide static sealing, and an inner lip 14 the end of which presses radially against the outer surface of the piston 2, to provide dynamic sealing as this piston slides.

The annular seal 1 comprises a substantially planar rear face pressing against a planar radial rear face of the annular housing 6.

The annular seal 1 also comprises an axial lip 12 which is radially intermediate between the outer lip 10 and the inner lip 14 and is directed substantially axially, and the end of which presses against a substantially radial front face of the annular housing 6 in order axially to wedge this seal between the two, front and rear, faces of the housing.

The annular seal 1 additionally comprises a small radial lip 16 extending radially outwards, which extends the rear face of this seal and presses against the rear face of the annular housing 6. A small volume V situated under the outer cylindrical wall of the housing 6 is thus delimited between the outer lip 10 and the radial lip 16.

The radial lip 16 acts to supplement the action of the outer lip 10, as a second sealing barrier placed in series to strengthen the static sealing between the annular seal 1 and the body 4.

When the piston 2 is in the rear rest position, the inner lip 14 drops down into a groove 20 of the piston 2, the depth of which is shallow and the side walls of which are gently inclined. The rear wall of this groove 20 has a radial drilling 22 which opens, firstly, to the rear of this inner lip 14 and secondly into the pressure chamber 24 of the master cylinder.

The radial drilling 22 thus, when the driver has released the brake pedal, and in the rest position depicted in this figure, places the pressure chamber 24 in communication with a reservoir of liquid in order to adjust the level in the hydraulic circuit.

Figure 2:
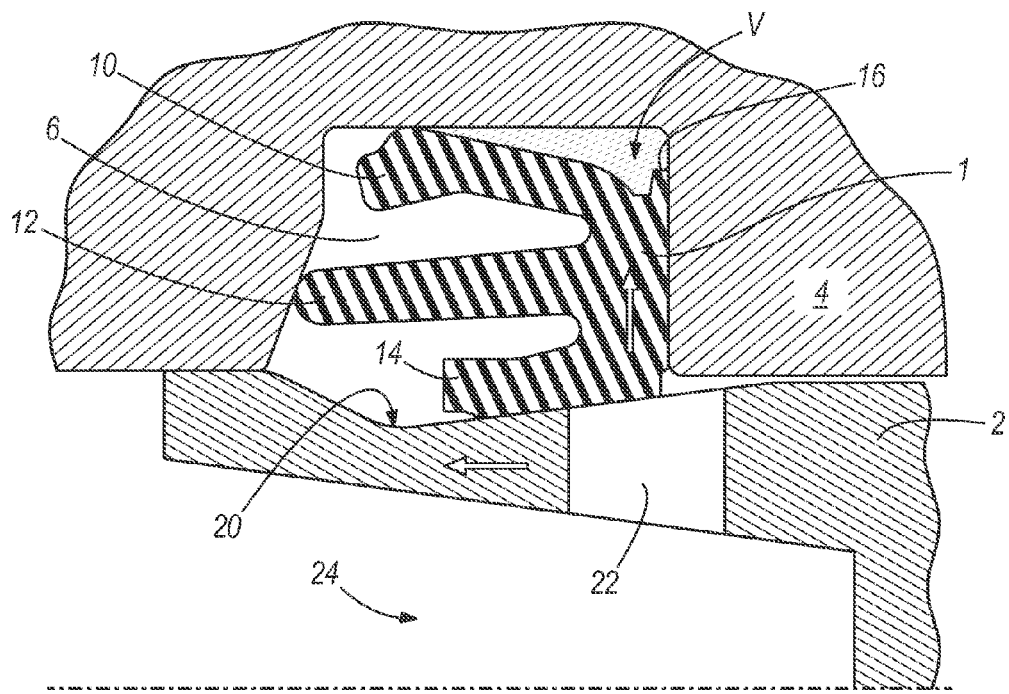
FIG. 2 is a half-view of this annular seal following a small amount of piston travel.
Figure 3:
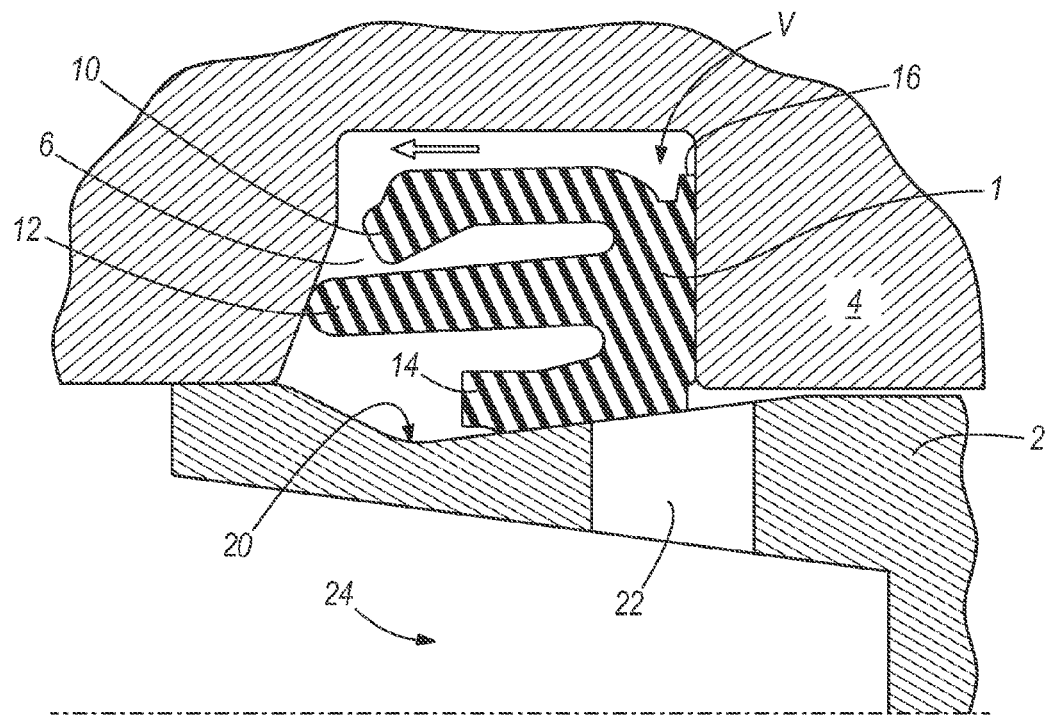
FIG. 3 is a half-view of this annular lip seal with the outer lip lifting.
Figure 4:
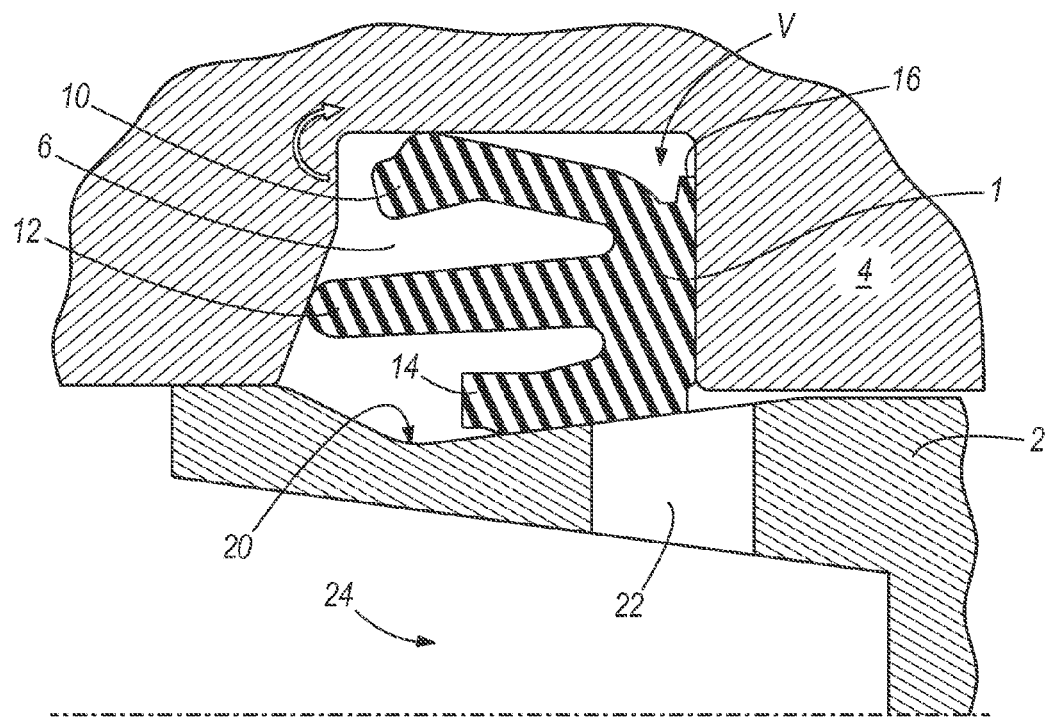
FIG. 4 is a half-view of this annular lip seal with the outer seal closing again.

The way in which the annular seal 1 according to the invention works is illustrated by FIGS. 2 to 4. When the piston 2 begins its forward travel under braking, the inner lip 14 of the annular seal 1, sliding along the rear slope of the groove 20, rises gradually radially outward, as depicted in FIG. 2.

This rising movement causes outward radial compression of the elastic material of the annular seal 1, and this in its turn compresses the small liquid-filled volume V. The pressure of the liquid in this volume V firstly causes the radial lip 16 to press more firmly against the rear wall of the annular housing 6, and secondly, above and beyond a certain pressure, allows the outer lip 10 to move, thus allowing this volume to empty at least in part, as depicted in FIG. 3.

Once this volume has been emptied at least in part, and the pressure within it has dropped, the outer lip 10, acting like a check valve, comes back to press against the bottom of the housing as depicted in FIG. 4, and re-closes the volume V.

At the end of braking, with the pedal returning to its rest position, the inner lip 14 drops back down into the groove 20, the pressure in the material of the seal decreases and the volume V increases once again, causing an internal pressure reduction which has a tendency to move the radial lip 16. The liquid is therefore sucked in by this radial lip, and the volume V becomes filled once again.

Thus, on each braking cycle, a movement of a small volume of fluid is created, this fluid being successively driven forward from the volume V then sucked in from the rear.

Figure 5:
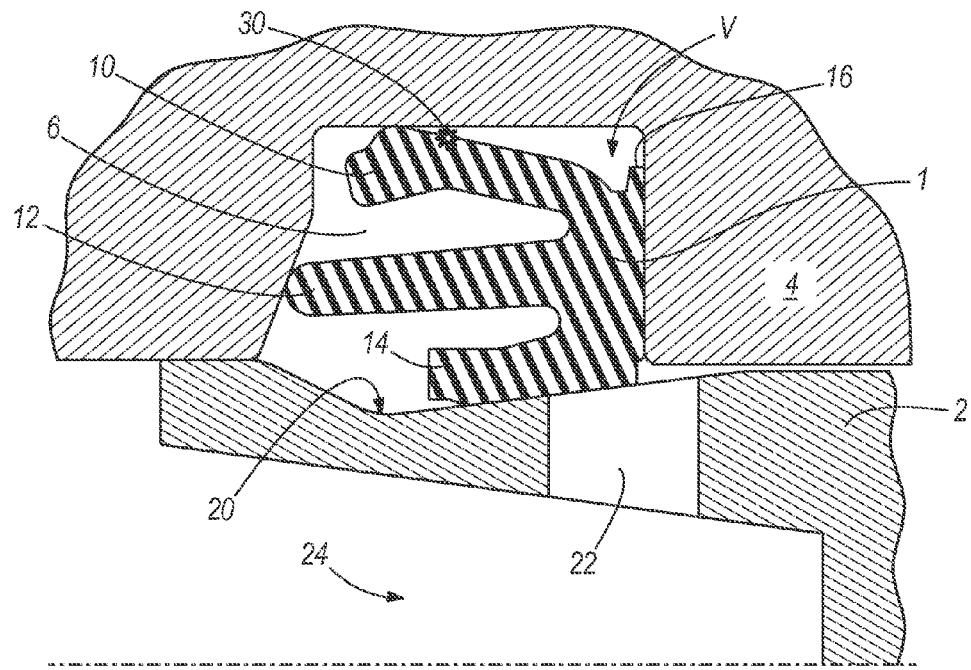
FIGS. 5 and 6 are half-views of this annular lip seal with particles driven out of the closed small volume.
Figure 6:
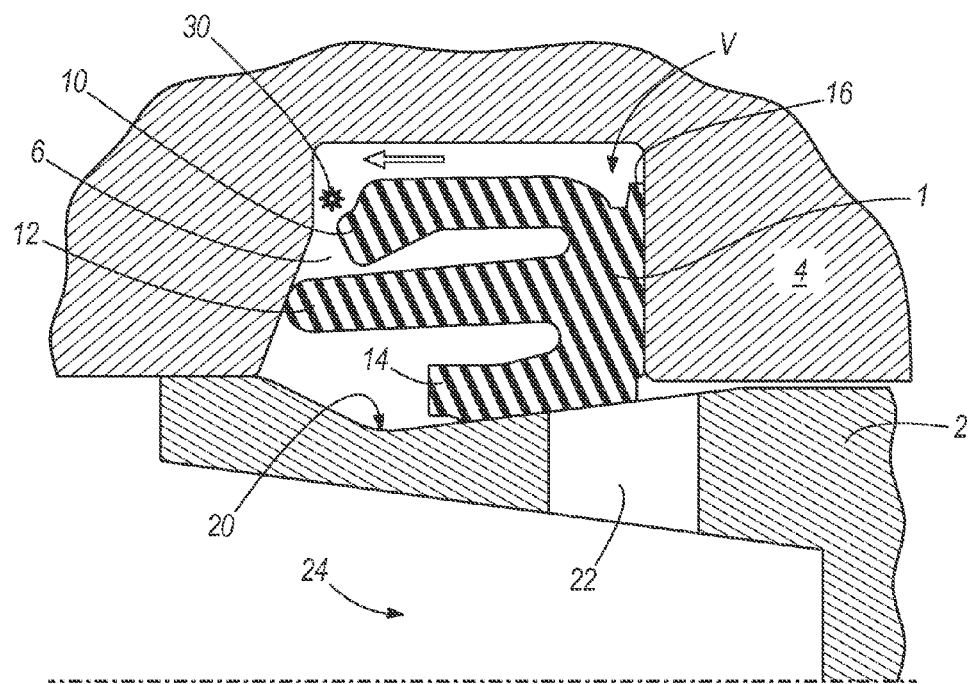

FIGS. 5 and 6 illustrate the effect of this movement of fluid on a particle 30 which may have remained jammed under the outer lip 10 of the annular seal 1.

As the volume V is emptied, the liquid carries the particle 30 along in its forward movement. The regions of contact between the outer lip 10 and the bottom of the housing can thus be systematically cleaned on each braking cycle. The same is true of the radial lip 16 which, under the effect of the passage of the fluid, may also be cleaned.

As far as the inner lip 14 that provides dynamic sealing is concerned, the movement of the piston 2 on each braking cycle effects a sliding on this lip, permanently encouraging the removal of particles.

Better guarantees of obtaining sealing that will last over time, even with a brake fluid containing suspended particles, are thus provided in an economical way.

The invention claimed is:

1. Master cylinder for a hydraulic braking circuit, comprising a piston (2) sliding axially in a body (4) and collaborating with an annular seal (1) placed in a housing (6) of the body (4), this seal comprising an internal dynamic sealing lip (14) surrounding the piston, the internal dynamic sealing lip (14) fitting into an annular groove (20) of the piston when this piston is in a rear rest position, and an outer static sealing lip (10) pressing against a first wall of the housing, the outer static sealing lip (10) having a top surface, characterized in that the seal comprises an additional static sealing lip (16) which extends primarily radially from the top surface toward the first wall and also presses against a second, generally radially extending wall of the housing, wherein the outer static sealing lip (10) and the additional static sealing lip (16) define a concave groove therebetween that defines a small closed volume (V) of liquid between the outer static sealing lip (10), the additional sealing lip (16) and the first wall of the housing.

2. Master cylinder according to claim 1, characterized in that when the piston (2) leaves its rear rest position, the inner lip (14) leaves the annular groove (20) and, the annular seal (1) compresses the small volume (V) which deflects the outer static sealing lip (10), and thereby drives the liquid out of this volume.

3. Master cylinder according to claim 2, characterized in that the outer lip (10) is positioned to press against the first wall of the housing with a slight inclination so as to form a check valve that opens in the event of a raised pressure in the small volume (V).

4. Master cylinder according to claim 3, characterized in that the additional lip (16) is positioned to press against the second wall of the housing with a slight inclination and forms a check valve that opens in the event of a reduced pressure in the small volume (V).

5. Master cylinder according to claim 4, characterized in that the outer lip (10) extends substantially axially, to press against a radially exterior cylindrical surface of the housing (6), and in that the additional lip (16) extends substantially radially, pressing against a planar radial rear surface of this housing.

6. Master cylinder according to claim 1, characterized in that the annular seal (1) comprises an axial lip (12) which is radially intermediate between the outer lip (10) and the inner lip (14) and is directed substantially axially, and the end of which presses against a substantially radial front surface of the annular housing (6).

7. Master cylinder according to claim 2, characterized in that the additional lip (16) is positioned to press against the second wall of the housing with a slight inclination and forms a check valve that opens in the event of a reduced pressure in the small volume (V).

8. Master cylinder according to claim 5, characterized in that the annular seal (1) comprises an axial lip (12) which is radially intermediate between the outer lip (10) and the inner lip (14) and is directed substantially axially, and the end of which presses against a substantially radial front surface of the annular housing (6).

9. Master cylinder according to claim 1, characterized in that the second, radial wall of the housing is substantially planar and the seal defines a substantially planar rear face that includes the additional static sealing lip (16).

10. Master cylinder according to claim 1, characterized in that the static sealing lip (16) extends radially so as to extend the rear face of the seal in a radial direction.

11. Master cylinder for a hydraulic braking circuit of a motor vehicle, comprising a piston (2) sliding axially in a body (4) and collaborating with an annular seal (1) placed in a housing (6) of the body (4), this seal comprising an internal dynamic sealing lip (14) surrounding the piston, the internal dynamic sealing lip (14) fitting into an annular groove (20) of the piston when this piston is in a rear rest position, and an outer static sealing lip (10) pressing against a first wall of the housing, characterized in that the seal comprises a substantially planar rear face including an additional static sealing lip (16), the additional static sealing lip (16) facing the first wall and having two generally radially extending surfaces and one generally axially extending surface in an undeformed position, wherein the substantially planar rear face presses against a second, radial wall of the housing of this seal along an entire distance spanning from at least a portion of the inner dynamic sealing lip (14) to at least a portion of the outer static sealing lip (10), wherein the outer static sealing lip (10), the additional static sealing lip (16) and the second, radial wall define a cavity operable to hold a small closed volume (V) of liquid.

12. Master cylinder according to claim 11, characterized in that when the piston (2) leaves its rear rest position, the inner lip (14) leaves the annular groove (20) and the annular seal (1) compresses the small volume (V) which deflects the outer static sealing lip (10), and thereby drives the liquid out of this volume.

13. Master cylinder according to claim 12, characterized in that the outer lip (10) is positioned to press against the first wall of the housing with a slight inclination so as to form a check valve that opens in the event of a raised pressure in the small volume (V).

14. Master cylinder according to claim 13, characterized in that the additional lip (16) is positioned to press against the second, radial wall of the housing with a slight inclination and forms a check valve that opens in the event of a reduced pressure in the small volume (V).

15. Master cylinder according to claim 14, characterized in that the outer lip (10) extends substantially axially, pressing against a radially exterior cylindrical surface of the housing (6), and in that the additional lip (16) extends substantially radially, pressing against a planar radial rear surface of this housing.

16. Master cylinder according to claim 11, characterized in that the annular seal (1) comprises an axial lip (12) which is radially intermediate between the outer lip (10) and the inner lip (14) and is directed substantially axially, and the end of which presses against a substantially radial front surface of the annular housing (6).

17. Master cylinder according to claim 12, characterized in that the additional lip (16) is positioned to press against the second, radial wall of the housing with a slight inclination and forms a check valve that opens in the event of a reduced pressure in the small volume (V).

18. Master cylinder according to claim 15, characterized in that the annular seal (1) comprises an axial lip (12) which is radially intermediate between the outer lip (10) and the inner lip (14) and is directed substantially axially, and the end of which presses against a substantially radial front surface of the annular housing (6).

19. Master cylinder according to claim 11, characterized in that the additional static sealing lip (16) extends radially outward with respect to at least a portion of the outer static sealing lip (10).

\* \* \* \* \*